June 24, 1930.  L. H. MOULTHROP  1,767,607
ELECTRIC SOLDERING DEVICE
Filed Sept. 17, 1927
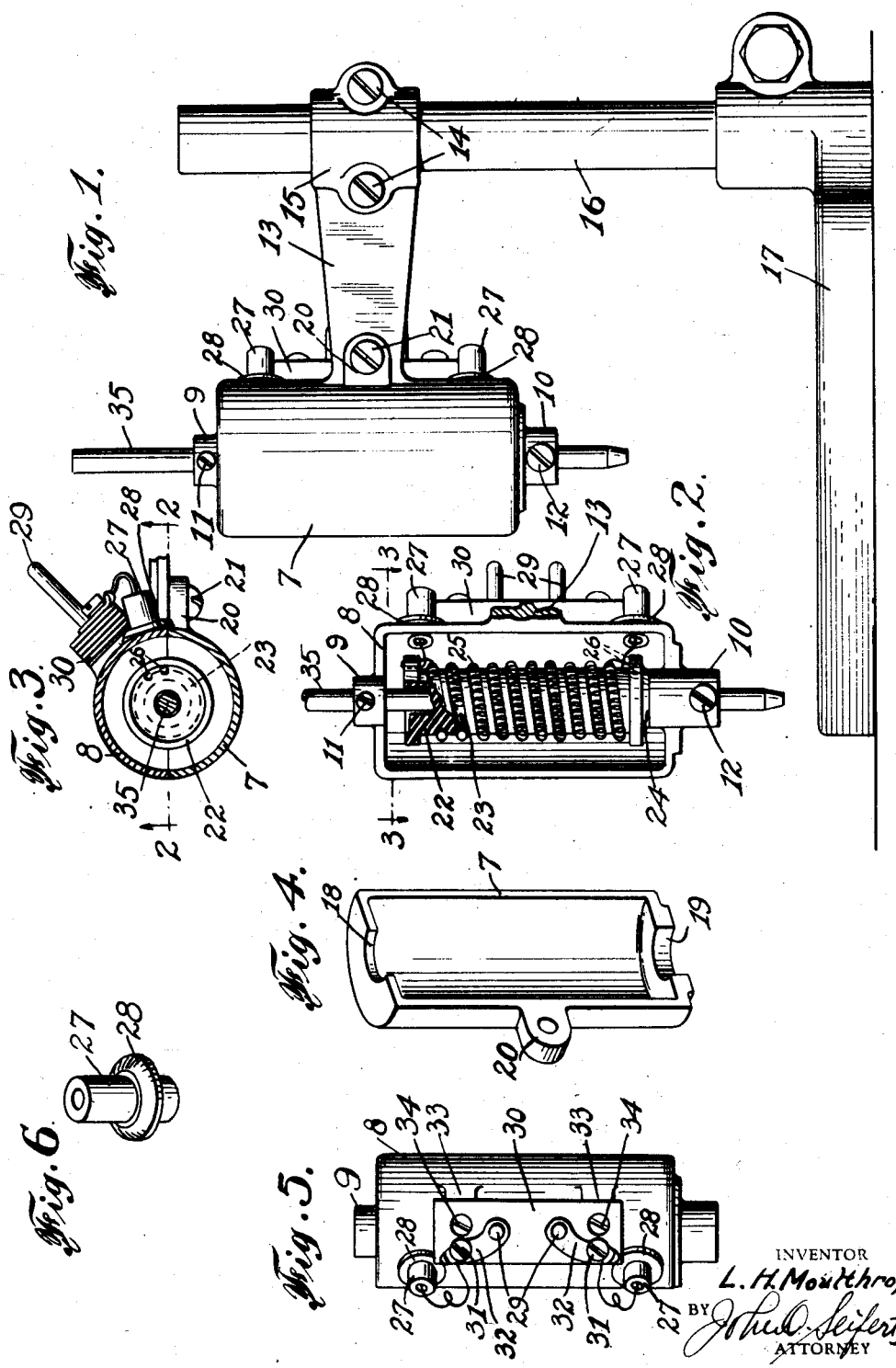
INVENTOR
L. H. Moulthrop
BY
ATTORNEY Patented June 24, 1930

1,767,607

UNITED STATES PATENT OFFICE

LEMBERT H. MOULTHROP, OF SOUTH NORWALK, CONNECTICUT

ELECTRIC SOLDERING DEVICE

Application filed September 17, 1927. Serial No. 220,251.

This invention relates to electric soldering irons, and it is the object of the invention to provide a soldering iron of this character adapted to be used either in a stationary position above the work, or to be manually held relative to the work.

It is a further object of the invention to provide in a soldering iron of this character a bit adjustably mounted relative to an electric heating element and adapted to be removed and replaced without disturbing the other parts of the soldering iron.

Another object of the invention is to provide an electric soldering iron in which the parts thereof are readily accessible for replacement or repairs.

Still another object of the invention is to provide an improved support for the soldering iron adapted for the supporting of the work and the adjusting of the soldering iron relative to the work.

Other objects and advantages of the invention will hereinafter appear.

In carrying out the invention there is provided a housing comprising a pair of mating shells releasably connected, and arranged to be adjustably mounted on a standard above the work and adapted to carry an electric heating element therein embodying a hollow mounting member of a material having the properties of being an electric insulator and having thermal conductivity for an electric resistance element. The bit of the iron is extended through and carried by the housing to have adjustment longitudinally of the mounting member for and of the heating element, or to be removed from the housing without disturbing the housing or heating element.

In the drawing accompanying and forming a part of this specification, Figure 1 is an elevational view of an assembled soldering iron and support.

Figure 2 is an elevational view, taken on the line 2—2 of Figure 3 looking in the direction of the arrows, of one shell of the housing looking at the interior and showing a heating element, partly broken away, and a bit mounted therein.

Figure 3 is a cross sectional view taken on the line 3—3 of Figure 2 looking in the direction of the arrows.

Figure 4 is a perspective view of the mating shell of the housing to that shown in Figure 2.

Figure 5 is a view of the shell shown in Figure 2 looking at the right thereof; and Figure 6 is a perspective view of an electric insulator bushing carried by the shell shown in Figures 2 and 5 for the passage of the terminals of the heating element.

Similar characters of reference designate like parts throughout the different views of the drawing.

The embodiment of the invention illustrated in the drawing comprises a protective housing assembled from a pair of mating shells 7, 8 of semi-cylindrical shape with one of the shells 8 arranged with integral perforated bosses 9, 10 centrally at the opposite ends and having threaded therein set screws 11, 12, and an integral arm 13 intermediate the ends extending laterally from the marginal edge with the free end grooved transversely to the axis of the arm and having threaded perforations at opposite sides of the groove for the engagement of screws which are carried by a U-shaped member 15 forming a clamp in conjunction with the grooved portion of the arm for adjustably mounting the housing upon a standard 16 for the purpose of changing the distance of the iron relative to a base 17 which supports the standard and upon which the work is positioned. The shell 7 is arranged with central recesses 18, 19 at the opposite ends to embrace the bosses 9, 10 of the shell 8 when the shells are assembled, and to releasably secure the shells in said position the shell 7 has a lateral extending perforated lug 20 intermediate the ends adapted for the engagement of a screw 21 for threaded connection with a threaded perforation in the arm 13.

An electric heater element is arranged in the housing embodying a resistance element and carrier or mounting member therefor comprising a tubular member in the form of a spool 22 of electric insulating and thermal conducting material, said spool having a spiral groove 23 on the exterior surface and at the ends flanges with the bottom flange arranged with an abutment 24 for engagement with and support upon the boss 10. The resistance element comprises a coiled electric resistance wire 25, such as commonly used in electric heaters, is wound about and engaging in the spool groove with the terminals looped through perforations 26 in the spool flanges to secure said terminals and prevent unwinding of the coil from the spool. The terminals are extended to the exterior of the housing through bushings 27 of insulating material engaged in perforations in the housing shell 8, said bushings having an annular flange 28 adjacent the end that is positioned in the perforation in the shell 8 with the flanges abutted against the exterior wall of the shell when the bushings are engaged in the perforations. The coil terminals are electrically connected to terminal pins 29 by screws 31 threaded in perforations into conductor arms 32 carrying the terminal pins, set screws 31 also being threaded into an insulator block 30 to mount the pin carrying arms 32 thereon. The insulator block is mounted upon lugs 33 extending laterally from the shell 8 by screws 34, as shown in Figure 5, providing a space between the block and shell for the circulation of air and preventing heating of the block by heat transmitted through the shell wall. The block is mounted in such a position on the shell that it will overlap a portion of the flanges 28 of the bushings 27 and thereby securing the same in the shell perforations without the necessity of other securing means.

The bit of the iron comprises a rod 35, preferably of copper, of a diameter so as to slidably fit in the perforations of the bosses 9, 10 and have longitudinal movement through the center of and in close proximity to the spool 22 within the heat zone radiated by the heating element 25 and transmitted through the material of the spool. The rod is secured in position in the housing by the set screws 11, 12.

The iron can be adjusted relative to the work on the base 17 by loosening the screws 14 and sliding the arm 13 on the standard 16 away from and toward and laterally of the work on the base 17 as described. The set screws 11, 12 may be loosened to longitudinally adjust the bit relative to the work. The soldering point of the bit tends to accumulate the solder thereon and it becomes necessary to file away the portion with the accumulated solder thus shortening the bit, and by this arrangement a bit of considerable length can be utilized and this continued reducing of the bit point compensated for.

By the adjustable mounting of the bit in the bosses 9 and 10, the temperature of the soldering point of the bit may be varied to adapt the iron to different kinds of work. The nearer the point is to the heating spool 22 the higher will be the temperature of the point.

Should the heating element 25 become broken due to oxidation and unusable another may be readily substituted therefor by releasing the housing shells by removing the screw 21. The bit is then removed by loosening the screws 11, 12. The terminals of the heating element are released by loosening the screws 31 when a new spool carrying a heating element may be substituted therefor.

While I have illustrated and described one embodiment of the invention, it will be obvious that various modifications may be made in construction and arrangement of parts and come within the scope of the invention.

Having thus described my invention I claim:

1. In an electric soldering iron, a housing having alined perforations therein, an electric heater including a tubular body of electric insulating and thermal conducting material and a resistance element carried by said body, said heater being of less cross sectional dimension than the housing, an insulator block carrying contact terminals exterior of the housing to which the resistance element is electrically connected, a bit extended through the openings in the housing and the opening in the heater body contiguous to the wall thereof to mount and maintain the heater in spaced relation to the wall of the housing, and means to releasably support the bit in the housing openings.

2. In an electric soldering iron, a housing embodying separable sections arranged with alined openings, an electric heating element including a spool of electric insulating and thermal conducting material and a coil of electric resistance wire coiled about the exterior of the spool, said heating element being of less cross sectional dimension than the interior of the housing, contact terminals mounted on the exterior of and insulated from one housing section to which the terminals of the coil are connected, a bit extended through the openings in the housing and spool and by means of which bit the spool is mounted and positioned in spaced relation to the housing, means to support the bit in said housing perforations, and means to secure the housing sections together.

3. In an electric soldering iron, a housing comprising a pair of mating shells adapted to be releasably connected, one shell having integral bosses at the ends and the other arranged at the ends with recesses conforming to the shape of the bosses, an electric heating element within the housing upon one boss, a bit extended through the housing and the heating element and insulated therefrom and positioning the heating element in engagement with the one boss within and spaced from the housing, and means to adjustably support the bit in the housing bosses.

4. In an electric soldering iron, a housing arranged with alined perforations therein, a heating element carried within the housing including a spool of electric insulating and thermal conducting material having a spiral groove in the outer surface and a coil of electric resistance wire wound about and engaged in the spiral groove, said heating element being of less cross sectional dimension than the housing, an insulator block carrying contact terminal pins mounted on the exterior of the housing and to which terminal pins the terminals of the coil are electrically connected, a bit extended through the housing perforations and spool adapted to position and maintain the heating element in spaced relation to the housing, and means to releasably support the bit in the housing perforations.

5. In an electric soldering iron, a housing embodying separable sections one section being arranged with alined openings, an electric heater of less cross sectional dimension than the housing carried in and insulated from the housing including a tubular member of electric insulating and thermal conducting material and a resistance element mounted on the exterior of said member, contact terminals mounted on the exterior of and insulated from the section arranged with the openings to which the terminals of the coil are connected for connection of the coil to a source of electricity, a bit extended through the openings in the one housing section and through the opening in the tubular member arranged in contiguous relation to the wall thereof to mount the heater in said housing section and position the same in spaced relation to the wall of the housing, and means to secure the other housing section to the section having the heater mounted therein and in spaced relation to the heater.

Signed at Bridgeport, in the county of Fairfield and State of Connecticut, this 8th day of September, 1927.

LEMBERT H. MOULTHROP.